United States Patent
Katayama

(10) Patent No.: US 7,120,911 B1
(45) Date of Patent: Oct. 10, 2006

(54) PROCESSOR POWER-SAVING CONTROL METHOD, STORAGE MEDIUM, AND PROCESSOR POWER-SAVING CONTROL DEVICE

(75) Inventor: Yoshiaki Katayama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 819 days.

(21) Appl. No.: 09/926,468

(22) PCT Filed: Nov. 20, 2000

(86) PCT No.: PCT/JP00/08176

§ 371 (c)(1),
(2), (4) Date: Nov. 8, 2001

(87) PCT Pub. No.: WO01/67243

PCT Pub. Date: Sep. 13, 2001

(30) Foreign Application Priority Data

Mar. 8, 2000 (JP) .............................. 2000-063188

(51) Int. Cl.
G06F 9/48 (2006.01)
G06F 1/32 (2006.01)

(52) U.S. Cl. ..................... 718/102; 713/330; 713/320; 713/300

(58) Field of Classification Search ........ 718/100–108; 713/300–323, 330; 710/260
See application file for complete search history.

(56) References Cited

U.S. PATENT DOCUMENTS

| | | | | |
|---|---|---|---|---|
| 5,455,932 A * | 10/1995 | Major et al. | ................ | 711/162 |
| 5,623,677 A * | 4/1997 | Townsley et al. | ........... | 713/310 |
| 6,067,631 A * | 5/2000 | Choi | ......................... | 713/500 |
| 6,079,025 A * | 6/2000 | Fung | .......................... | 713/323 |
| 6,269,409 B1 * | 7/2001 | Solomon | ..................... | 719/329 |
| 6,631,394 B1 * | 10/2003 | Ronkka et al. | ............ | 718/100 |
| 6,715,016 B1 * | 3/2004 | Ohno et al. | ................. | 710/260 |
| 6,772,419 B1 * | 8/2004 | Sekiguchi et al. | ......... | 719/319 |
| 2005/0149933 A1 * | 7/2005 | Saito et al. | ................. | 718/100 |

FOREIGN PATENT DOCUMENTS

| | | |
|---|---|---|
| JP | 55-57953 | 4/1980 |
| JP | 59-197938 | 11/1984 |
| JP | 62-150416 | 7/1987 |
| JP | 63-311442 | 12/1988 |
| JP | 5-158710 | 6/1993 |

OTHER PUBLICATIONS

Goodman, Michele Ann et al. "Solaris Porting Guide." Timers. SunSoft. p. 386-387. 1993.*

* cited by examiner

*Primary Examiner*—Lewis A. Bullock, Jr.
(74) *Attorney, Agent, or Firm*—Oblon, Spivak, McClelland, Maier & Neustadt, P.C.

(57) ABSTRACT

The present invention is employed in the environment in which a plurality of OSs exist on a single processor having a power-saving function, and includes a primary OS for receiving a timer interrupt from a hardware timer after a predetermined time lapse and a secondary OS treated as a task to be executed by the primary OS, wherein upon receiving the timer interrupt, the primary OS determines whether there exists any task to be executed, and interrupts the secondary OS if there is any task to be executed on the secondary OS.

33 Claims, 15 Drawing Sheets

PROCESSOR POWER-SAVING CONTROL METHOD, STORAGE MEDIUM, AND PROCESSOR POWER-SAVING CONTROL DEVICE

This application is the national phase under 35 U.S.C. § 371 of PCT International Application No. PCT/JP00/08176 which has an International filing date of Nov. 20, 2000, which designated the United States of America and was not published in English.

TECHNICAL FIELD

The present invention relates to a processor power-saving control method employed in the environment in which a plurality of OSs (Operating Systems) exist on a single processor having a power-saving function. This method collectively controls a timer interrupt issued to each OS so as to avoid individual timer interrupts being separately issued so that a processor power-saving mode can be maintained, reducing the power consumption.

BACKGROUND ART

Portable information terminals such as portable telephones and laptop computers use rechargeable batteries as their power source. When these battery-powered terminals are continuously used, however, their maximum operation time will be a few hours at most. Therefore, to extend the operation time of these terminals, it is essential to improve their power-saving function to efficiently use the battery power. One known power-saving function shifts to a power-saving mode by stopping supply of clocks to the processor or reducing the frequency level of the clocks during idle time, that is, when there exists no task to be executed by the processor, in order to reduce the power consumed by the processor. The processor which has been shifted to the power-saving mode is restarted using a timer interrupt from a hardware timer as a trigger.

FIG. 1 is a conceptual diagram showing a conventional processor power-saving control method. In FIG. 1, reference numeral 22 denotes a processor. Reference numeral 23 denotes a first OS; 24 a hardware timer for issuing a timer interrupt to the first OS 23 at predetermined time intervals (periodic interrupt) or at a specified time (non-periodic interrupt); 25 a timer handler for receiving a timer interrupt from the hardware timer 24; 26 a scheduler called by the timer handler 25 for executing tasks in an orderly manner; 27 a power-saving mechanism which is called by the scheduler 26 when there is no task to be executed and which shifts the processor 22 to the power-saving mode; and 28 a task to be executed by the first OS 23. The hardware timer 24 issues a timer interrupt to the first OS 23 and outputs a start-up signal to the processor 22 in the power-saving mode to restart it, at the same time.

On the other hand, reference numeral 29 denotes a second OS; 30 a hardware timer for issuing a timer interrupt to the second OS 29 at predetermined time intervals (periodic interrupt) or at a specified time (non-periodic interrupt); 31 a timer handler for receiving a timer interrupt from the hardware timer 30; 32 a scheduler called by the timer handler 31 for executing tasks in an orderly manner; 33 a power-saving mechanism which is called by the scheduler 32 when there is no task to be executed and which shifts the processor 22 to the power-saving mode; and 34 a task to be executed by the second OS. The hardware timer 30 issues a timer interrupt to the second OS 29 and outputs a start-up signal to the processor 22 in the power-saving mode to restart it, at the same time.

As described above, the hardware timers 24 and 30 are provided for the first OS 23 and the second OS 29, respectively. That is, the hardware timers 24 and 30 issue timer interrupts to the first OS 23 and the second OS 29, separately and respectively. Accordingly, in the conventional processor power-saving control method, the processor 22 is restarted each time a timer interrupt is issued to an OS, which makes it difficult to efficiently keep the power-saving mode.

To solve the above problem, an object of the present invention is to propose a processor power-saving control method and a processor power-saving control device executing the method employed in the environment in which a plurality of OSs exist on a single processor, wherein the processor power-saving control method can collectively control a timer interrupt issued to each OS so as to reduce the number of timer interrupts to be issued, efficiently maintaining the processor power-saving mode.

DISCLOSURE OF INVENTION

According to one aspect of the present invention, a processor power-saving control method employs a plurality of OSs whose execution is controlled by a processor, wherein the plurality of OSs include a primary OS for receiving a timer interrupt issued from a hardware timer after a predetermined time lapse, and a secondary OS treated as a task to be executed by the primary OS, the processor power-saving control method comprising the steps of: upon receiving the timer interrupt, determining whether there exists any task to be executed, this step being performed the primary OS; and when there exists any task to be executed on the secondary OS, interrupting the secondary OS.

With this arrangement, it is possible to prevent a timer interrupt from being issued by each OS separately, efficiently maintaining the processor power-saving mode.

According to another aspect of the present invention, a processor power-saving control method employs a plurality of OSs whose execution is controlled by a processor, operation of the processor being stopped when there exists no task to be executed on the plurality of OSs, the processor power-saving control method controlling timer interrupt processing performed by a hardware timer which activates the processor after an arbitrary time lapse, the processor power-saving control method keeping a power-saving state of the processor, the plurality of OSs including a primary OS for receiving a timer interrupt issued from the hardware timer and a secondary OS treated as a task to be executed by the primary OS, wherein the processor power-saving control method comprises a primary-OS process step performed by the primary OS, a secondary-OS process step performed by the secondary OS, and a secondary-OS interrupt step, the primary-OS process step including: a step of detecting the timer interrupt; a first determination step of, upon receiving the timer interrupt, determining whether there exists any task to be executed; and a processor stopping step of, when there is no task to be executed, stopping the processor; the secondary-OS process step including: a second determination step of determining whether there exists any task to be executed; and a step of, when there is no task to be executed, handing over processing to the first determination step; whereby when the first determination step has determined that there exists any task to be executed on the secondary OS, the secondary-OS interrupt step performs interrupt processing on the secondary OS, and executes the second determination step at a predetermined time measured from the interrupt.

With this arrangement, it is possible to prevent a timer interrupt from being separately issued by each hardware timer assigned to a plurality of OSs, efficiently maintaining the processor power-saving mode.

According to still another aspect of the present invention, a processor power-saving control method includes a secondary-OS interrupt step executed by a periodically-activating handler which interrupts a secondary OS at regular time intervals.

With this arrangement, it is possible to use a periodically activating handler function provided by an OS so as to collectively control a timer interrupt requested by each OS, reducing the number of timer interrupts to be issued and thereby efficiently maintaining the power-saving mode.

According to still another aspect of the present invention, a processor power-saving control method includes a secondary-OS interrupt step executed by an alarm handler which interrupts a secondary OS after a specified time period.

With this arrangement, it is possible to use a periodically activating handler function provided by an OS so as to issue only necessary timer interrupts, efficiently maintaining the power-saving mode.

According to still another aspect of the present invention, a processor power-saving control method includes a secondary-OS interrupt step executed by a high-priority task which is a task for interrupting the secondary OS and has a highest priority order among tasks to be executed by the primary OS.

With this arrangement, it is possible to issue only necessary timer interrupts by use of the high-priority task even when the OS has no periodically activating handler function and no alarm handler function, efficiently maintaining the power-saving mode.

According to still another aspect of the present invention, a processor power-saving control method comprises a processor stopping step which includes a step of determining whether time taken until a hardware timer issues a next timer interrupt is longer than a predetermined time, and if a measured time is longer than the predetermined time, the processor stopping step stops operation of a processor.

With this arrangement, it is possible to prevent occurrence of overheads caused as a result of frequently shifting the processor to the power-saving mode (they occur when it takes time to return from the power-saving mode) by shifting to the power-saving mode only when the idle time of the processor exceeds a predetermined time, that is, not always shifting to the power-saving mode during the idle time.

According to still another aspect of the present invention, a processor power-saving control method comprises a primary-OS process step which includes steps of: when a hardware timer periodically performs timer interrupt processing at regular time intervals, determining whether timer interrupt processing is required again by a time at which a task is to be executed, and if timer interrupt processing is not required again, stopping a hardware timer.

With this arrangement, even when the system timer is implemented using non-periodic interrupts and a time-of-day timer is required, it is possible to collectively control the time-of-day timer and the primary-OS system timer interrupts, reducing the number of timer interrupts to be issued and thereby keeping the processor in the power-saving mode for a longer time.

According to still another aspect of the present invention, a processor power-saving control method comprises a primary-OS process step which includes a step of: detecting a timer interrupt issued by a long-periodic hardware timer which issues a timer interrupt at a time interval longer than that of a hardware timer.

With this arrangement, it is possible to issue a timer interrupt using the long-periodic timer for a task having a different execution wait time and thereby stop the hardware timer to reduce the power consumption.

According to still another aspect of the present invention, a processor power-saving control method comprises a primary-OS process step which includes a step of: detecting a timer interrupt issued by a time-of-day timer which measures a time of day as well as issuing a timer interrupt at a predetermined time of day.

With this arrangement, it is possible to issue a timer interrupt at an accurate time of day.

According to still another aspect of the present invention, a computer readable storage medium stores a plurality of OSs whose execution is controlled by a processor which is stopped when there exists no task to be executed, the plurality of OSs including a primary OS for receiving a timer interrupt issued from a hardware timer which activates the processor after an arbitrary time lapse, and a secondary OS treated as a task to be executed by the primary OS, wherein the computer readable storage medium stores a program which causes a computer to perform a primary-OS process step on the primary OS, a secondary-OS process step on the secondary OS, and a secondary-OS interrupt step, the primary-OS process step including: a step of detecting a timer interrupt issued by the hardware timer; a first determination step of, upon detecting the timer interrupt, determining whether there exists any task to be executed; and a processor stopping step of, when there is no task to be executed, stopping the processor; the secondary-OS process step including: a second determination step of determining whether there exists any task to be executed; and a step of, when there is no task to be executed, handing over processing to the first determination step; whereby when the first determination step has determined that there exists any task to be executed on the secondary OS, the secondary-OS interrupt step performs interrupt processing on the secondary OS, and executes the second determination step at a predetermined time measured from the interrupt.

With this arrangement, it is possible to efficiently control the processor by use of the storage medium.

According to still another aspect of the present invention, a processor power-saving control device comprises: timer means including a hardware timer for issuing a timer interrupt after an arbitrary time lapse, and activating a processor, operation of the processor being stopped when there exists no task to be executed; and storage means storing a primary OS and a secondary OS; wherein upon receiving the timer interrupt, the primary OS determines whether there exists any task to be executed, and stops the processor if there is no task to be executed, or issues an interrupt if there is any task to be executed; and wherein upon receiving an interrupt from the primary OS, the secondary OS determines whether there exists any task to be executed, and if there is any task to be executed, the secondary OS executes the task, the secondary OS being treated as a task to be executed by the primary OS.

With this arrangement, only a single hardware timer is enough for the device, making it possible to prevent frequent reactivation of the processor due to issuance of timer interrupts by a plurality of hardware timers and thereby reduce the power consumption.

According to still another aspect of the present invention, a processor power-saving control device comprises a timer means having a long-periodic timer which issues a timer interrupt at a time interval longer than that of a hardware timer.

With this arrangement, it is possible to issue a timer interrupt using the long-periodic timer for a task having a different execution wait time and thereby stop the hardware timer to reduce the power consumption.

According to still another aspect of the present invention, a processor power-saving control device comprises a timer means having a time-of-day timer.

With this arrangement, it is possible to issue a timer interrupt at an accurate time of day.

BEST MODE FOR CARRYING OUT THE INVENTION

To provide detailed descriptions of the present invention, its preferred embodiments will be described below with reference to the accompanying drawings.

First Embodiment

Figure 1:
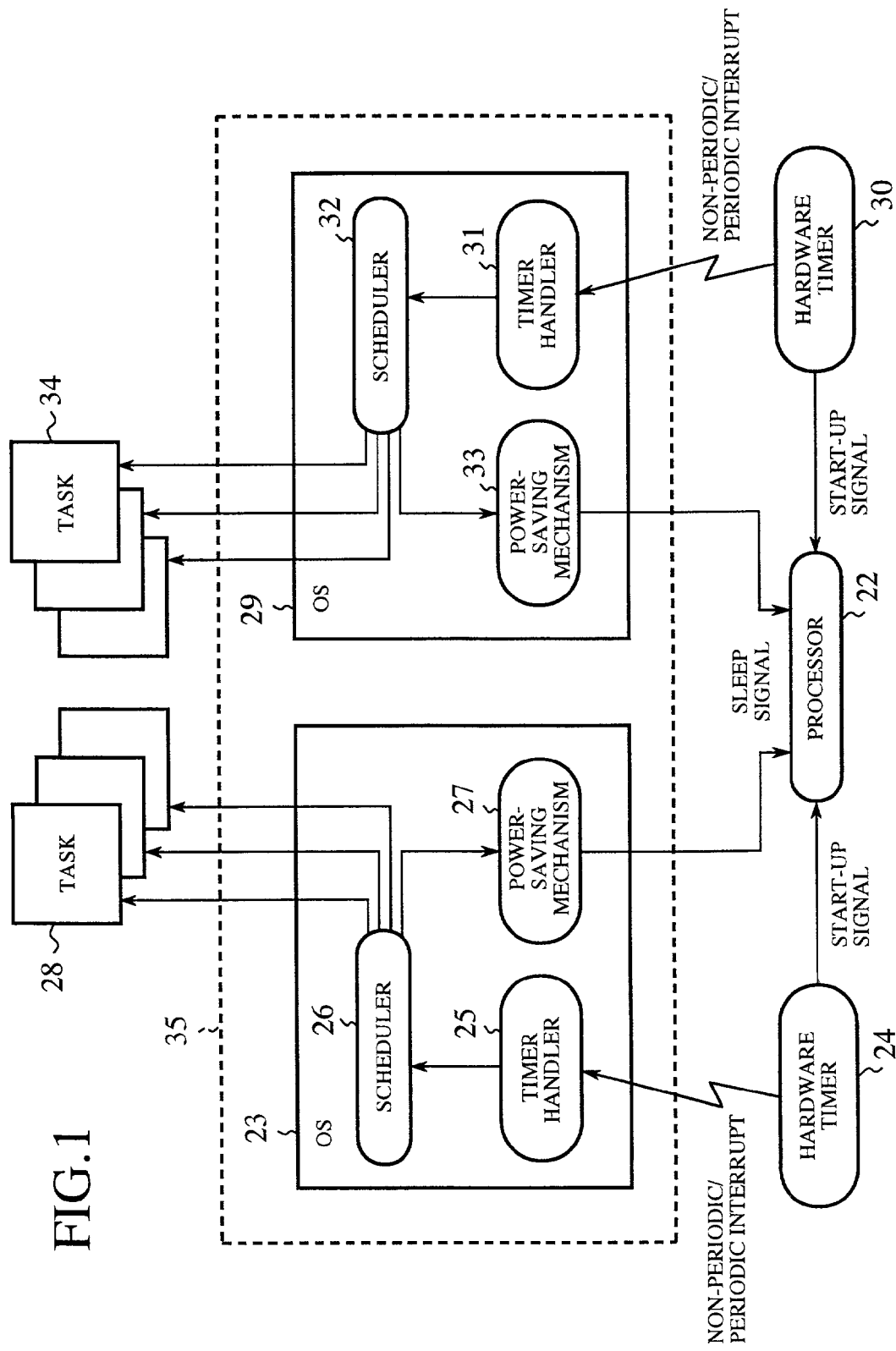
FIG. 1 is a conceptual diagram showing a conventional processor power-saving control device.
Figure 2:
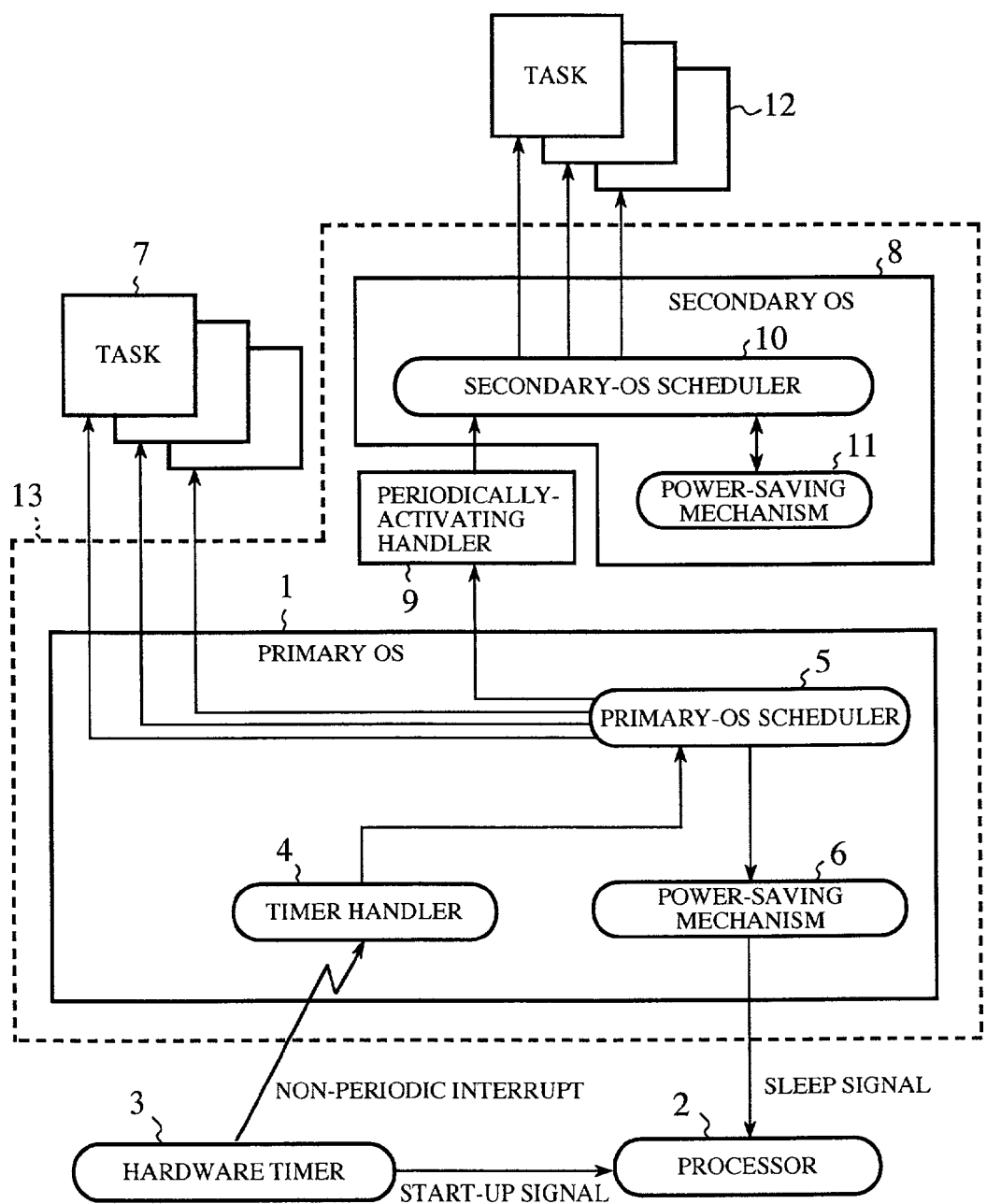
FIG. 2 is a conceptual diagram showing a processor power-saving control device according to a first embodiment of the present invention.
Figure 3:
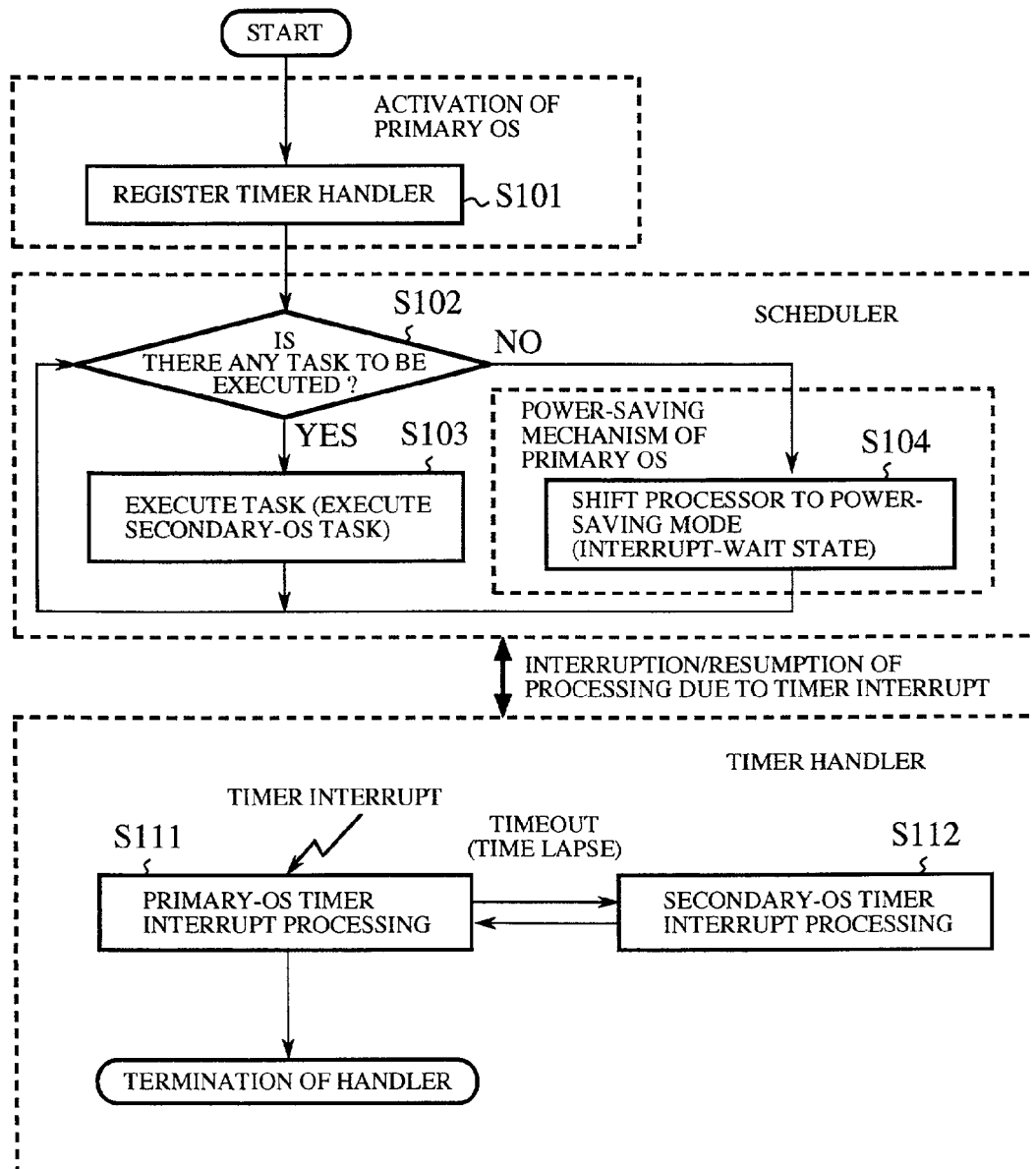
FIG. 3 is a flowchart illustrating primary-OS process steps employed by a processor power-saving control method according to the first embodiment of the present invention.
Figure 4:
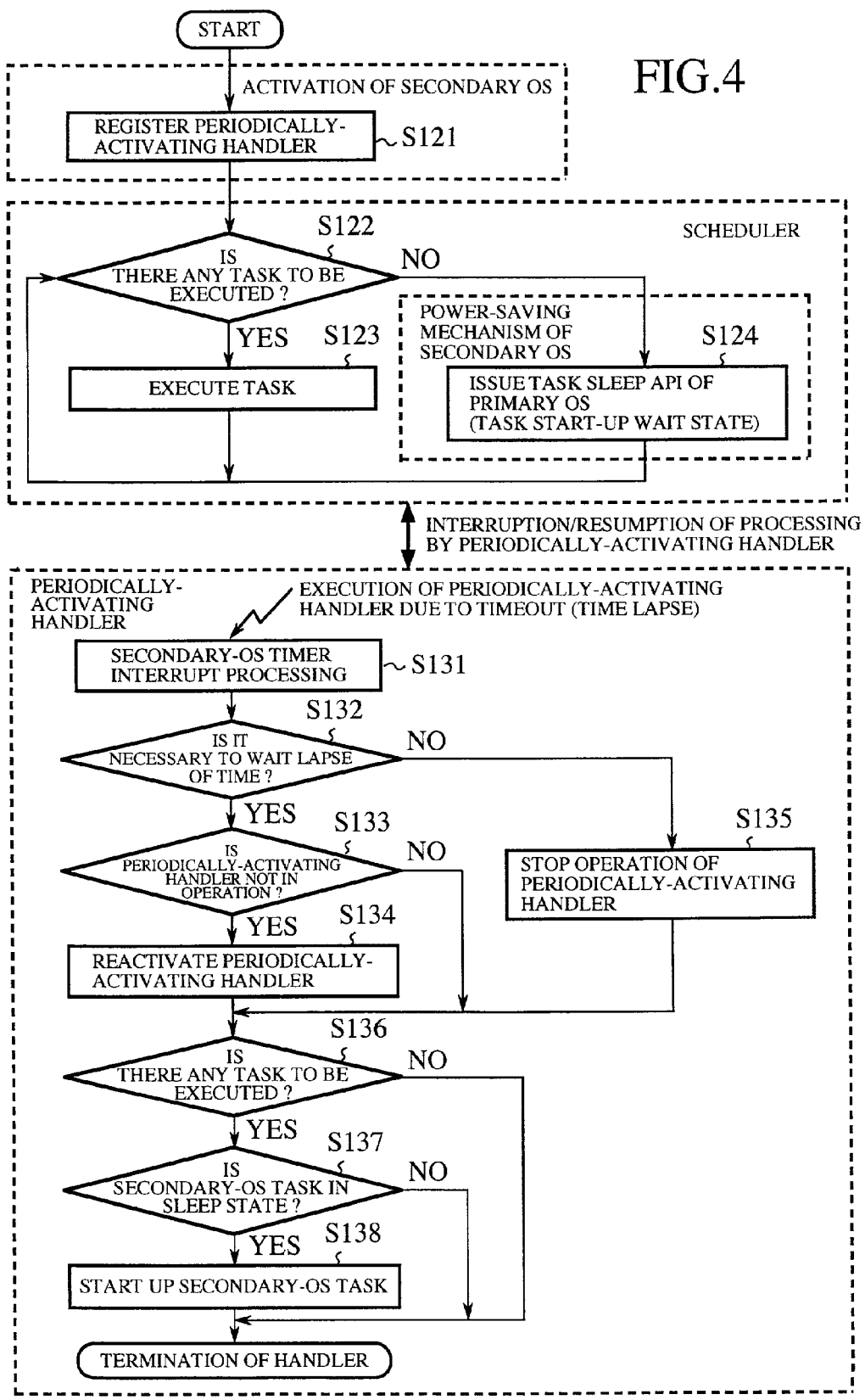
FIG. 4 is a flowchart illustrating secondary-OS process steps and secondary-OS interrupt steps employed by the processor power-saving control method according to the first embodiment of the present invention.

FIG. 2 is a conceptual diagram showing a processor power-saving control device according to a first embodiment of the present invention. FIG. 3 is a flowchart illustrating primary-OS process steps included in processes employed by a processor power-saving control method of the first embodiment. FIG. 4 is a flowchart illustrating secondary-OS process steps and secondary-OS interrupt steps employed by the processor power-saving control method. Referring to FIG. 2, reference numeral 1 denotes a primary OS for actually controlling hardware such as a processor and a timer; 2 a processor having a power-saving mode; 3 a hardware timer for issuing a non-periodic interrupt to the primary OS 1 so as to perform a timer interrupt operation only when it is necessary to issue a time lapse notification; 4 a timer handler of the primary OS 1 activated by a timer interrupt issued from the hardware timer 3; 5 a primary-OS scheduler called by the timer handler 4 for executing tasks in an orderly manner; 6 a power-saving mechanism of the primary OS 1 which is called when there exists no task to be executed on the primary OS 1 and which controls the processor 2 so that the process 2 is shifted to the power-saving mode; and 7 a primary-OS task to be processed on the primary OS 1.

Further, reference numeral 8 denotes a secondary OS which is an OS other than the primary OS 1 and operates as one of tasks to be processed by the primary OS 1; 9 a periodically activating handler which is activated by the primary OS 1 and operates as a timer handler of the secondary OS 8; 10 a secondary-OS scheduler called by the periodically activating handler 9 for executing tasks in an orderly manner; 11 a power-saving mechanism of the secondary-OS 8 which is called when there exists no task to be executed on the secondary OS 8 and which sets the secondary OS 8 (which is regarded as a task) in the sleep mode; 12 a task to be processed on the secondary OS 8; and 13 a storage means for storing the primary OS 1 and the secondary OS 8.

Description will be made below of primary-OS process steps employed by the processor power-saving control method according to the first embodiment of the present invention with reference to FIG. 3. At step S101, when the primary OS 1 is activated, the timer handler 4 is registered to receive a timer interrupt from the hardware timer 3. At step S102, the scheduler 5 of the primary OS 1 determines whether there exists any task to be executed on the primary OS 1. If there is any task to be executed, the scheduler 5 executes the task at step S103. The scheduler 5 handles the secondary OS 8 as one of tasks on the primary OS 1.

If there exists no task to be executed on the primary OS 1, the scheduler 5 calls the power-saving mechanism 6 of the primary OS 1. The power-saving mechanism 6 shifts the processor 2 to the power-saving mode at step S104. Incidentally, if the hardware timer 3 issues a timer interrupt in a state that the processor 2 has been shifted to the power-saving mode, the timer handler 4 of the primary OS 1 is activated to perform step S111. At step S111, the timer handler 4 calls the scheduler 5. The scheduler 5 determines whether any of the tasks including the secondary OS 8 are to be executed, and performs necessary operation based on the determination. For example, if the secondary OS 8 has reached a time point at which it must be executed (in other words, the secondary OS 8 has timed out), the scheduler 5 issues an interrupt to the secondary OS 8 at step S112. If it is determined at step S111 that there exists no task to be executed, the handler 4 is terminated, and the process returns to step S102.

Next, description will be made of the secondary process steps and secondary interrupt steps with reference to FIG. 4. The secondary OS 8 is treated as one of the tasks to be executed by the primary OS 1. At step S112, an interrupt issued by the primary OS 1 activates the secondary OS 8. Then, at step S121, the periodically activating handler 9 is registered to receive an interrupt from the primary OS 1. The periodically activating handler 9 has a function to carry out processing specified in the handler 9 itself, at specified regular time intervals, and operates as the system timer of the secondary OS 8. Upon receiving an interrupt from the primary OS 1, the periodically activating handler 9 is activated and calls the scheduler 10 of the secondary OS 8. The scheduler 10 of the secondary OS 8 determines at step S122 whether there exist any tasks to be executed, and if there are any tasks to be executed, the scheduler 10 executes the tasks at step S123. If there is no task to be executed on the secondary OS 8, on the other hand, the scheduler 10 calls the power-saving mechanism 11 of the secondary OS 8, and puts the secondary OS 8 in the sleep mode by use of an application program interface (API) of the primary OS 1 at step S124. It should be noted that even though the secondary OS 8 is in the sleep mode at this time point, the periodically activating handler 9 is still running and performs interrupt processing at specified times.

The secondary OS interrupt steps are carried out when the periodically activating handler 9, which operates as the system timer of the secondary OS 8, has timed out. Specifically, at step S131, the periodically activating handler 9 issues an interrupt to the secondary OS 8 so that the secondary OS 8 calls the scheduler 10 of the secondary OS 8. At step S132, the scheduler 10 of the secondary OS 8 determines whether it is necessary to wait a lapse of time before executing a task. If it is not necessary to wait a time, the scheduler 10 stops the periodically activating handler 9 at step 135 since no further interrupt need not be issued. If it is necessary to wait a time before executing a task, on the other hand, an interrupt need be reissued. Therefore, the scheduler 10 determines at step S133 whether the periodically activating handler 9 has stopped operating. If the periodically activating handler 9 is not operating, the scheduler 10 activates it again at step S134. The scheduler 10 then determines whether there exists any task to be executed on the secondary OS 8 at step S136. If there exists any task to be executed, the scheduler 10 determines whether the secondary OS 8 has been put in the sleep mode by use of the sleep API (step S124), and if the secondary OS 8 is in the sleep mode, the scheduler 10 activates the secondary OS 8 at step S138.

In the processor power-saving control method described above, it is arranged that only the primary OS 1 receives timer interrupts from the hardware timer 3, which reactivates the processor 2 at the same time with the issuance of the timer interrupts. Furthermore, since it is the periodically activating handler 9 called by the scheduler 5 of the primary OS 1 that interrupts the secondary OS 8, a single interrupt can be used to "timer-interrupt" both the primary OS 1 and the secondary OS 8. In addition, when tasks on the secondary OS 8 and the primary OS 1 need not wait a lapse of time, that is, when no further interrupt need be issued, it is possible to stop the hardware timer 3 from issuing interrupts. As a result, it is possible to reduce the number of interrupts to be issued from the hardware timer 3 and thereby maintain the processor 2 in the power-saving mode for a longer time, reducing power consumed by the mobile communications terminal.

Further, the processor power-saving control device described above requires only one hardware timer 3 therein. This prevents frequent activation of the processor 2 by timer interrupts from a plurality of hardware timers 3 if employed, reducing power consumed by the device.

Second Embodiment

Figure 5:
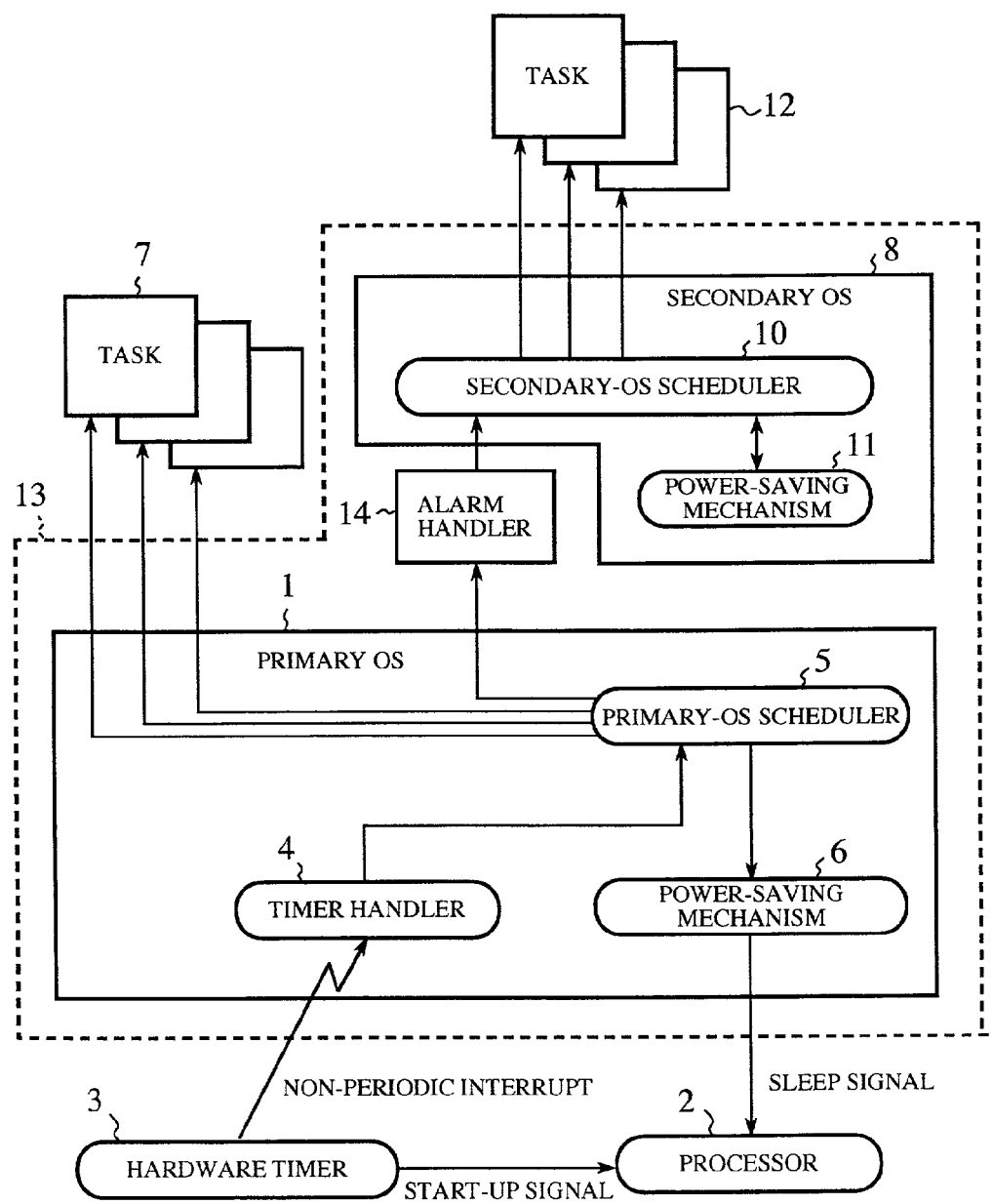
FIG. 5 is a conceptual diagram showing a processor power-saving control device according to a second embodiment of the present invention.
Figure 6:
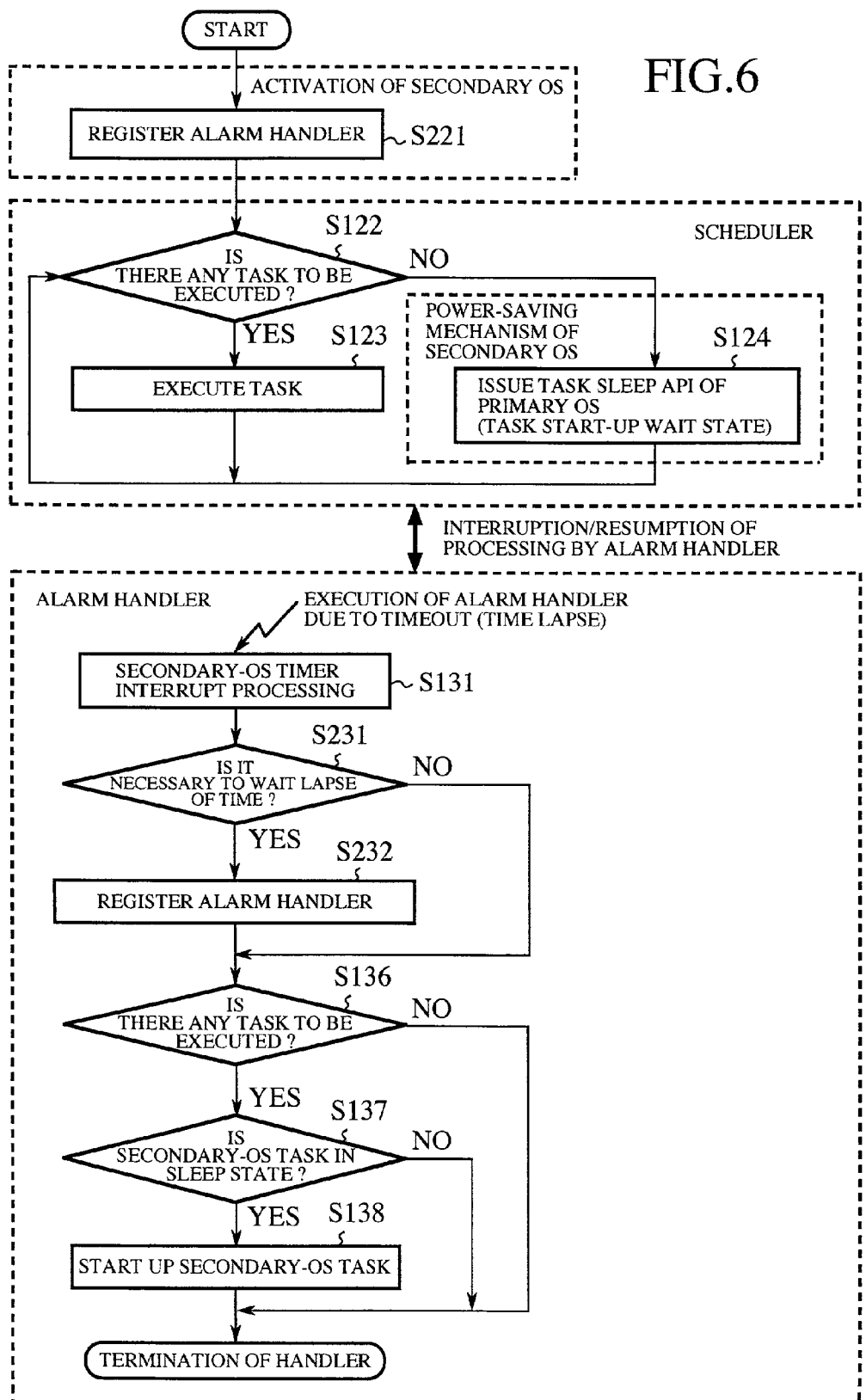
FIG. 6 is a flowchart illustrating secondary-OS process steps and secondary-OS interrupt steps employed by a processor power-saving control method according to the second embodiment of the present invention.

FIG. 5 is a conceptual diagram showing a processor power-saving control device according to a second embodiment of the present invention. FIG. 6 is a flowchart illustrating secondary-OS process steps and secondary-OS interrupt steps employed by a processor power-saving control method according to the second embodiment of the present invention. Referring to FIG. 5, reference numeral 14 denotes an alarm handler activated by the primary OS 1 and operating as a timer handler of the secondary OS 8. It should be noted that since components in FIG. 5 which are the same as or correspond to those in FIG. 2 are denoted by like numerals, their explanation will be omitted.

Since the primary-OS process steps are the same as those shown in FIG. 3, their explanation will be also omitted. Description will be made below of the secondary-OS process steps and the secondary-OS interrupt steps with reference to FIG. 6. The secondary OS 8 is treated as one of the tasks to be executed by the primary OS 1. At step S221, when the secondary OS 8 is activated, the alarm handler 14 is registered to receive an interrupt from the primary OS 1. The alarm handler 14 has a function to carry out processing specified in the handler itself once at a specified time, and operates as the system timer of the secondary OS 8. Upon receiving an interrupt from the primary OS 1, the alarm handler 14 is activated and calls the scheduler 10 of the secondary OS 8. Since the process steps S122 through S124 of the scheduler 10 of the secondary OS 8 are the same as those in FIG. 3, their explanation will be omitted.

The secondary OS interrupt steps are carried out when the alarm handler 14, which operates as the system timer of the secondary OS 8, has timed out. Specifically, at step S131, the alarm handler 14 issues an interrupt to the secondary OS 8 to call the scheduler 10 of the secondary OS 8. At step S231, it is determined whether it is necessary to wait a lapse of time as a result of interrupting the secondary OS 8. If it is necessary to wait a time, the alarm handler 14 is registered again at step S232 and the process proceeds to step S136. If it is determined at step S231 that it is not necessary to wait a time, on the other hand, the process directly proceeds to step S136.

In the processor power-saving control method of the first embodiment described earlier, the secondary OS 8 receives an interrupt through the periodically activating handler 9, which is the system timer of the secondary OS 8. Therefore, when it is necessary to wait a time before a task on the secondary OS 8 is executed, an interrupt is periodically issued from the periodically activating handler 9. As a result, the primary OS 1 needs to periodically receive an interrupt from the hardware timer 3. In the processor power-saving control method of the second embodiment described above, on the other hand, the secondary OS 8 receives an interrupt through the alarm handler 14, which issues an interrupt only once after a specified period of time. Therefore, it is possible to cause the hardware timer 3 to issue an interrupt only when absolutely required. As a result, even when there always exist a task which requires some time before it is executed, it is possible to reduce the number of interrupts to be issued from the hardware timer 3, keeping the processor 2 in the power-saving mode for a longer time.

Third Embodiment

Figure 7:
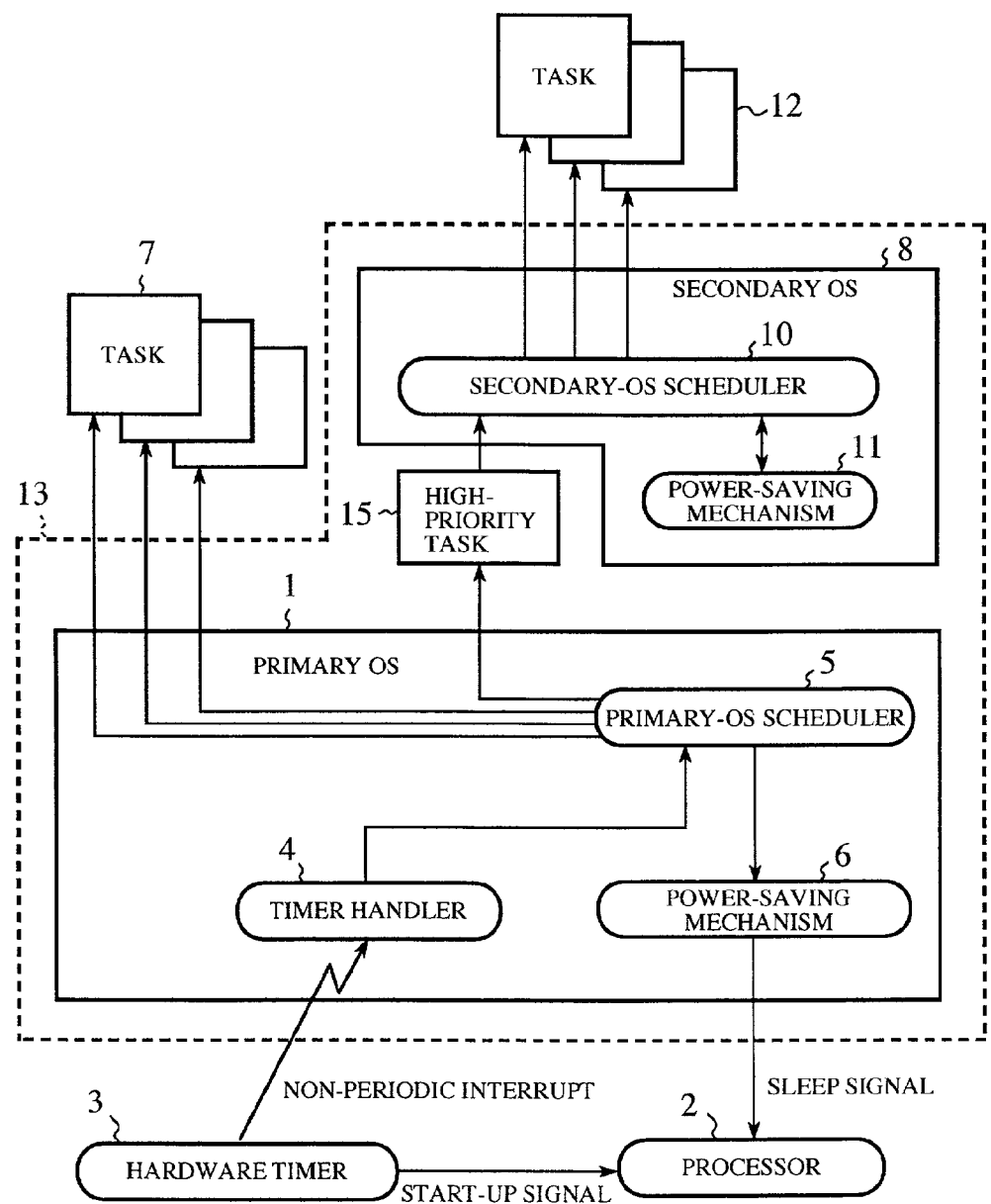
FIG. 7 is a conceptual diagram showing a processor power-saving control device according to a third embodiment of the present invention.
Figure 8:
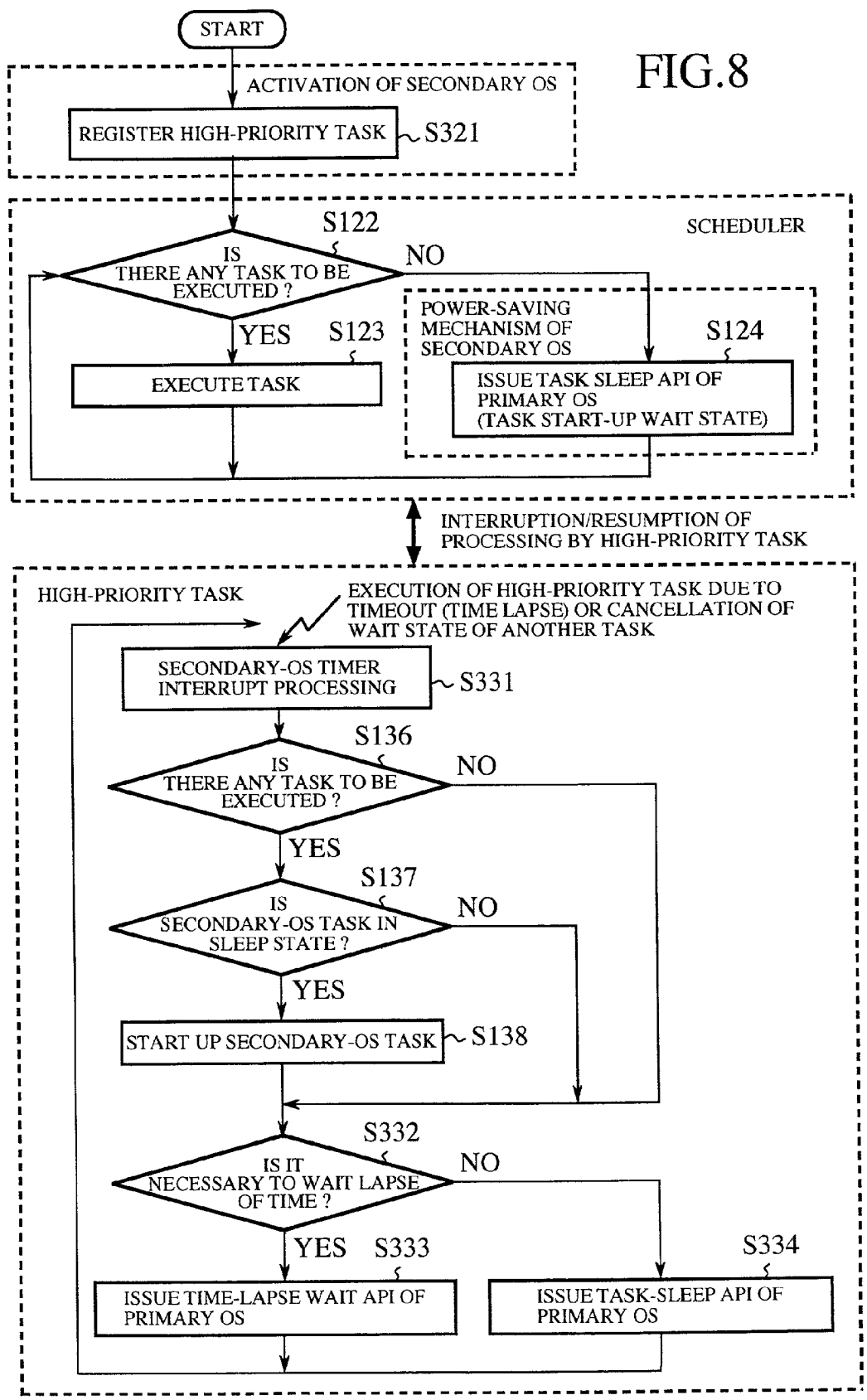
FIG. 8 is a flowchart illustrating secondary-OS process steps and secondary-OS interrupt steps employed by a processor power-saving control method according to the third embodiment of the present invention.

FIG. 7 is a conceptual diagram showing a processor power-saving control device according to a third embodiment of the present invention. FIG. 8 is a flowchart illustrating secondary-OS process steps and secondary-OS interrupt steps employed by a processor power-saving control method according to the third embodiment. Referring to FIG. 7, reference numeral 15 denotes a high-priority task activated by the primary OS 1 and operating as a timer handler of the secondary OS 8. Since the primary OS 1 executes tasks in the priority order, it is necessary to give the high-priority task 15 a higher priority than those of the tasks on the secondary OS 8. It should be noted that since components in FIG. 7 which are the same as or correspond to those in FIG. 2 are denoted by like numerals, their explanation will be omitted.

Since the primary-OS process steps are the same as those shown in FIG. 3, their explanation will be also omitted. Description will be made below of the secondary-OS process steps and the secondary-OS interrupt steps with reference to FIG. 8. The secondary OS 8 is treated as one of the tasks to be executed by the primary OS 1. At step S321, when the secondary OS 8 is activated, the high-priority task 15 is registered to receive an interrupt from the primary OS 1. The high-priority task operates as the system timer of the secondary OS 8. Upon receiving an interrupt from the primary OS 1, the high-priority task 15 is activated and calls the scheduler 10 of the secondary OS 8. Since the process steps S122 through S124 of the scheduler 10 of the secondary OS 8 are the same as those in FIG. 3, their explanation will be omitted.

When the high-priority task 15, which runs on the primary OS 1, has timed out or the wait state of tasks on the secondary OS is cancelled, the high-priority task 15 is activated and the secondary-OS interrupt processing is carried out. The high-priority task 15 performs the secondary-OS interrupt processing at step S331. Since the process steps S136 through S138 are the same as those in FIG. 4, their explanation will be omitted. At step S332, it is determined whether it is necessary to wait a lapse of time as a result of interrupting the secondary OS 8. If it is necessary to wait a time, a time-lapse wait API provided by the primary OS 1 is issued to put the high-priority task 15 in the sleep state at step S333. If it is not necessary to wait a time, on the other hand, a task sleep API of the primary OS 1 is issued to put the high-priority task 15 in the sleep state.

The processor power-saving control methods according to the first and second embodiments described above use the periodically activating handler 9 or the alarm handler 14 to implement the system timer of the secondary OS 8. Therefore, when the primary OS 1 does not have a handler function, it is not possible to realize an interrupt function. In the processor power-saving control method of the third embodiment described above, however, even when the primary OS 1 does not have a handler function, it is possible to perform interrupt processing on the secondary OS 8 without using the hardware timer 3 if the primary OS has a priority scheduling function.

Fourth Embodiment

Figure 9:
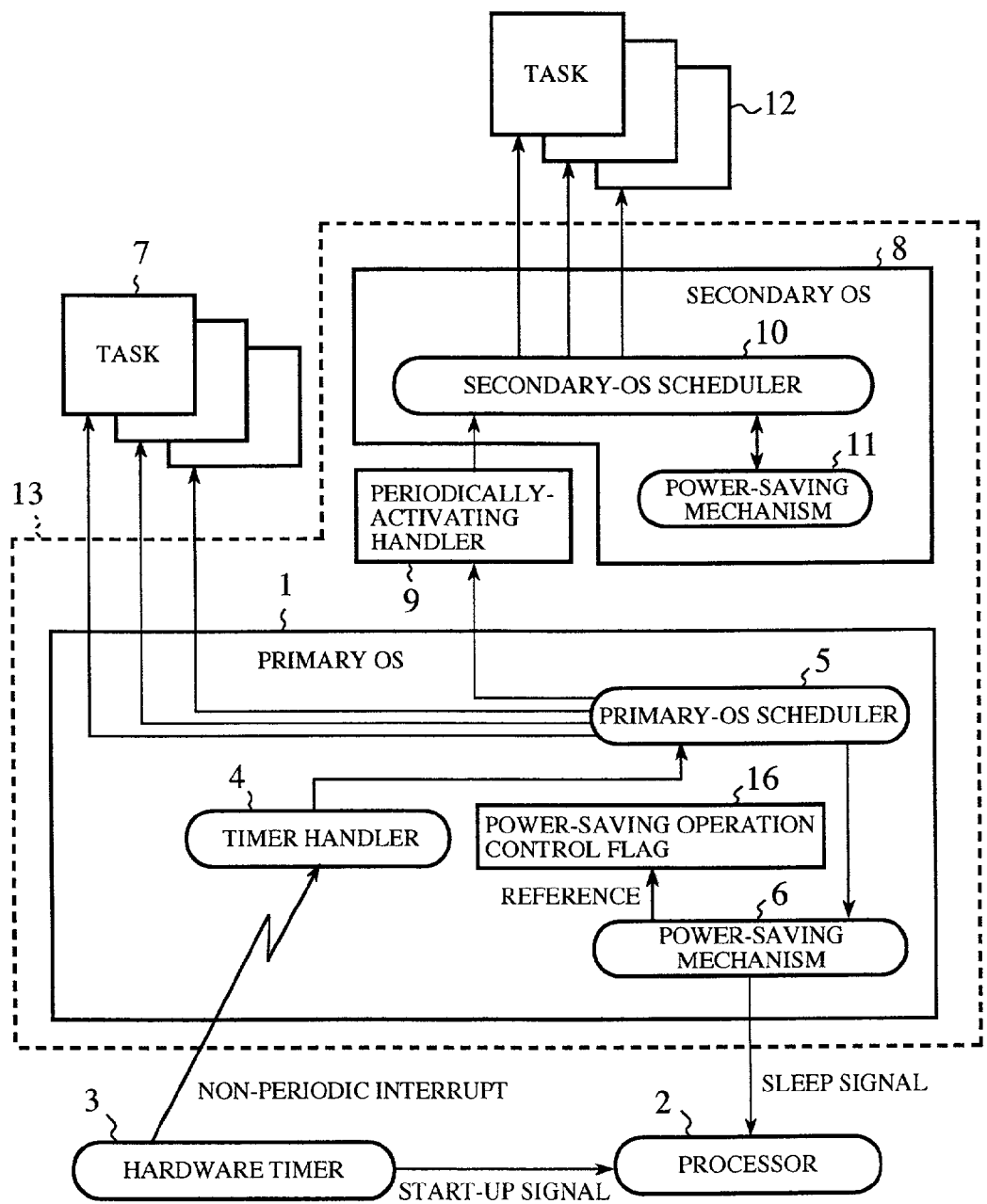
FIG. 9 is a conceptual diagram showing a processor power-saving control device according to a fourth embodiment of the present invention.
Figure 10:
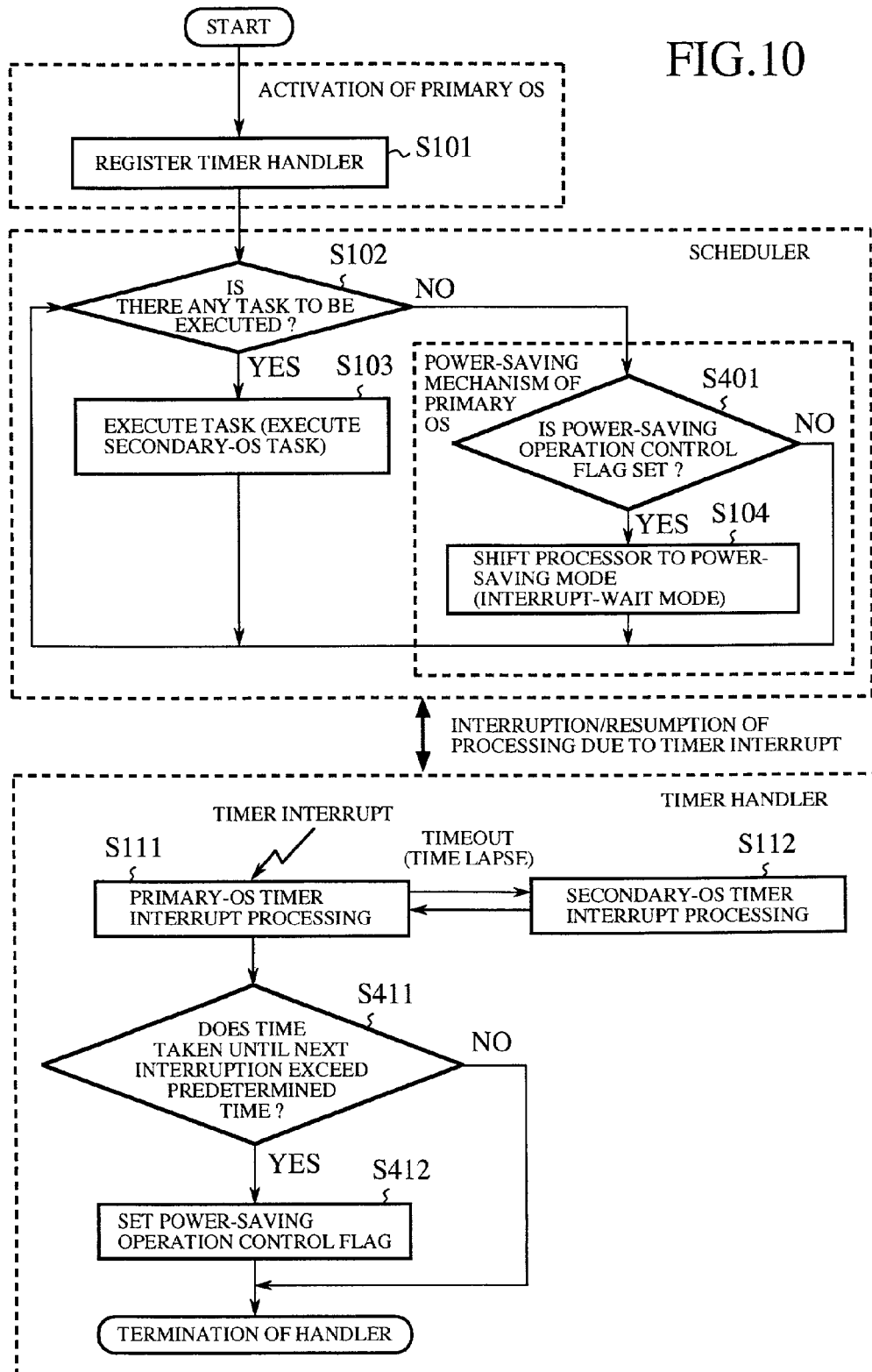
FIG. 10 is a flowchart illustrating primary-OS process steps employed by a processor power-saving control method according to the fourth embodiment of the present invention.

FIG. 9 is a conceptual diagram showing a processor power-saving control device according to a fourth embodiment of the present invention. FIG. 10 is a flowchart illustrating primary-OS process steps employed by a processor power-saving control method according to the fourth embodiment. Referring to FIG. 9, reference numeral 16 denotes a power-saving operation control flag to be set by the timer handler 4 of the primary-OS 1 and referenced by the power-saving mechanism 6 of the primary OS 1. It should be noted that since components in FIG. 9 which are the same as or correspond to those in FIG. 2 are denoted by like numerals, their explanation will be omitted.

The operation of the processor power-saving control method of the fourth embodiment will be described below. As in the first embodiment, the primary OS 1 receives a timer interrupt from the hardware timer 3, which is designed to issue a timer interrupt non-periodically, that is, it issues a timer interrupt only when a time lapse notification is required. Description will be made below of the primary-OS process steps with reference to FIG. 10. Since the process steps S101 through S104 are the same as those in FIG. 3, their explanation will be omitted. At step S401, the power-saving mechanism 6 checks the power-saving operation control flag to see whether it is set. The power-saving mechanism 6 shifts the processor 2 to the power-saving mode at step 104 only when the power-saving operation control flag 16 is set.

When a non-periodic interrupt is issued from the hardware timer 3, the timer handler 4 of the primary OS 1 is activated. Since the process steps S111 and S112 performed by the timer handler 4 are the same as those in FIG. 3, their explanation will be omitted. At step 411, it is determined whether time taken until the next interruption is longer than a predetermined time, and if it is longer than the predetermined time, the power-saving operation control flag 16 is set at step 412. Since the secondary-OS steps and the secondary-OS interrupt steps are the same as those in FIG. 4, their explanation will be omitted.

The processor power-saving control methods according to the first to third embodiments described above always put the processor 2 in the power-saving mode when there exists no task to be executed on the primary OS 1. However, if the processor 2 is frequently shifted to the power-saving mode, overheads occur (they occur when it takes time to return from the power-saving mode). To solve this problem, the processor power-saving control method of the fourth embodiment described above refers to the power-saving operation control flag 16, and shifts to the power-saving mode only when the idle time of the processor exceeds a predetermined time, preventing the processor 2 from frequently shifting to the power-saving mode.

Fifth Embodiment

Figure 11:
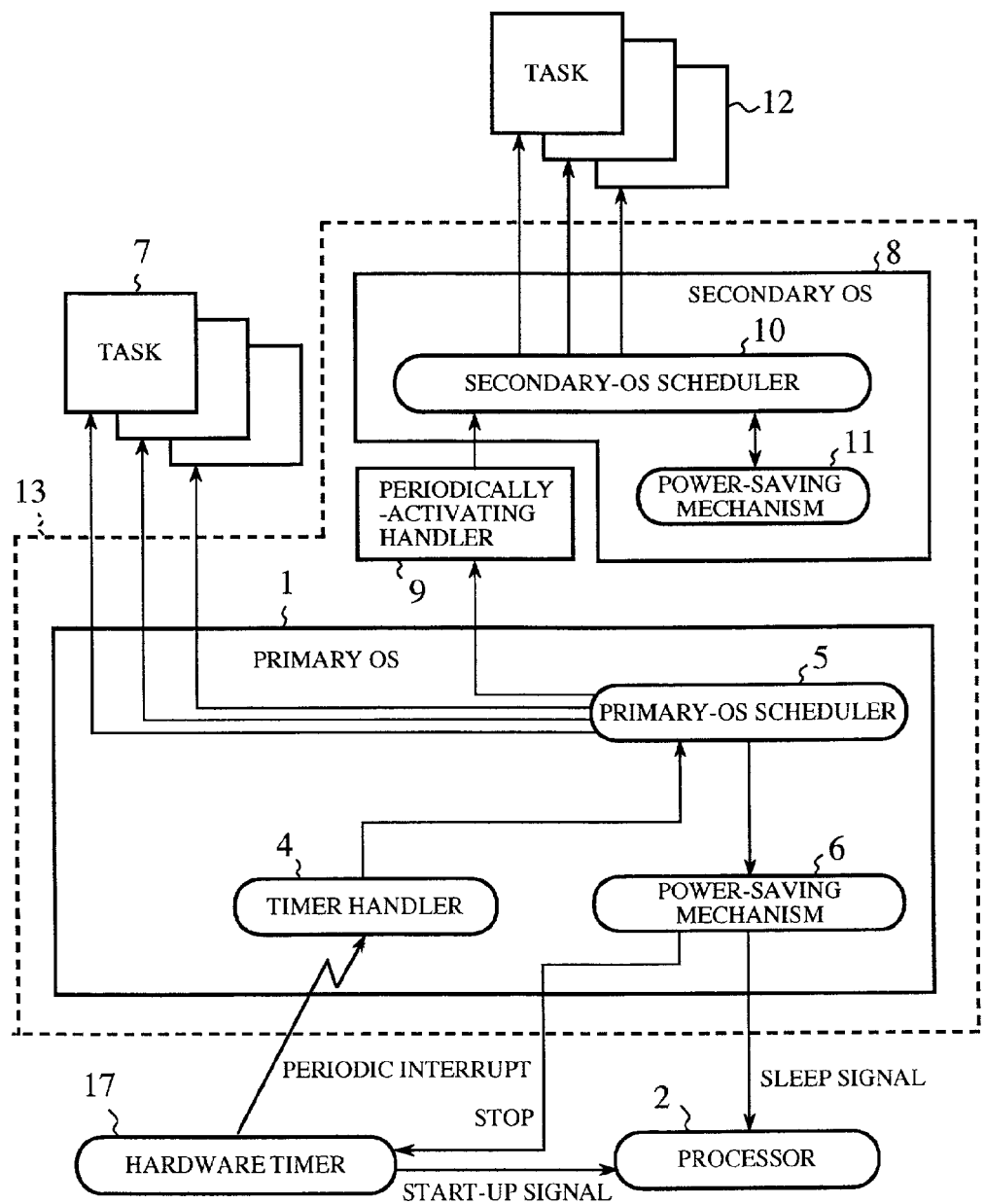
FIG. 11 is a conceptual diagram showing a processor power-saving control device according to a fifth embodiment of the present invention.
Figure 12:
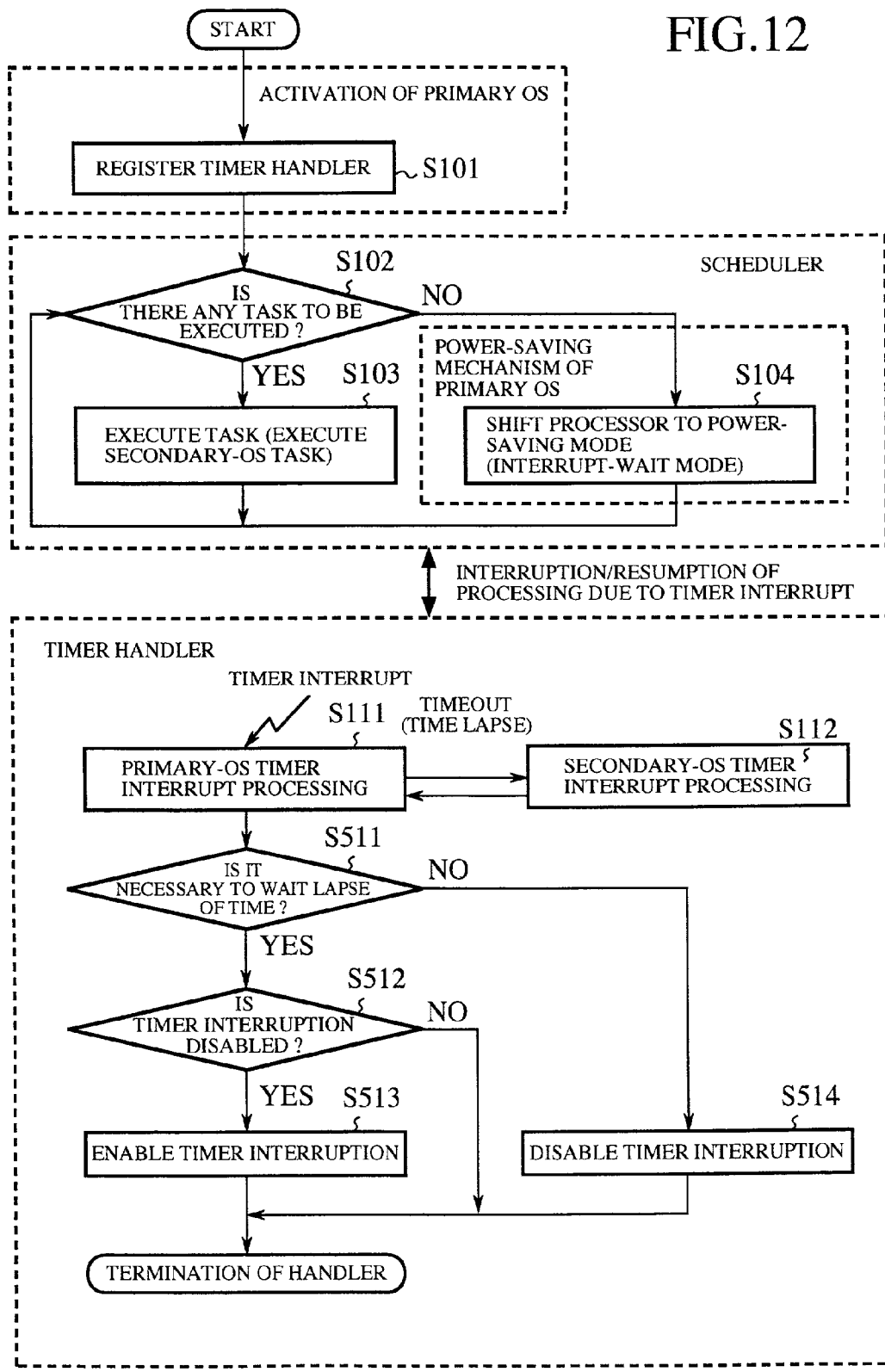
FIG. 12 is a flowchart illustrating primary-OS process steps employed by a processor power-saving control method according to the fifth embodiment of the present invention.

FIG. 11 is a conceptual diagram showing a processor power-saving control device according to a fifth embodiment of the present invention. FIG. 12 is a flowchart illustrating primary-OS process steps employed by a process power-saving control method according to the fifth embodiment. Referring to FIG. 11, reference numeral 17 is a hardware timer for periodically interrupting the primary OS 1 at predetermined time intervals. It should be noted that since components in FIG. 11 which are the same as or correspond to those in FIG. 2 are denoted by like numerals, their explanation will be omitted. The primary-OS process steps will be described below with reference to FIG. 12. When the hardware timer 17 issues a timer interrupt, the timer handler 4 of the primary OS 1 is activated. Since the process steps S111 and S112 are the same as those in FIG. 3, their explanation will be omitted. At step S511, it is determined whether it is necessary to wait a lapse of time as a result of timer-interrupting the primary OS 1. If it is necessary to wait a time at step S511, it is determined whether timer interruption is currently disabled. If timer interruption is currently disabled, the timer interruption is enabled at step S513. If it is determined that it is not necessary to wait a time at step S511, the hardware timer 17 is stopped at step S514 to disable the timer interruption.

Since the processor power-saving control method described above can employ periodical interrupts as the system timer of the primary OS 1, it is easy to realize a power-saving function. Furthermore, when it is not necessary to wait a lapse of time, so that there is no need for issuing an interrupt again, it is possible to stop the operation of the hardware timer 17 in order to reduce the number of interrupts to be issued from the hardware timer 17, keeping the processor 2 in the power-saving mode for a longer time.

Sixth Embodiment

Figure 13:
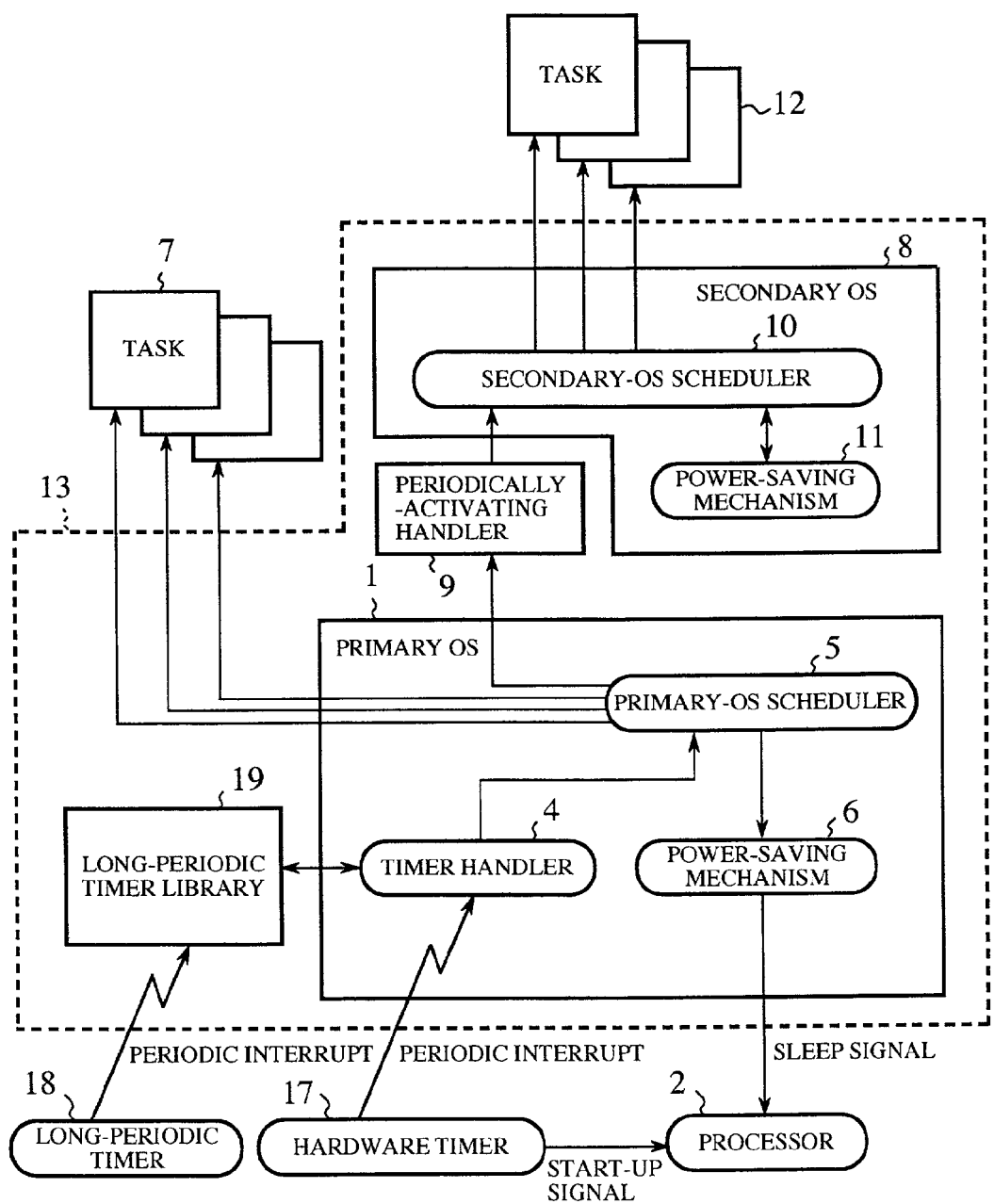
FIG. 13 is a conceptual diagram showing a processor power-saving control device according to a sixth embodiment of the present invention.

FIG. 13 is a conceptual diagram showing a processor power-saving control device according to a sixth embodiment of the present invention. Referring to FIG. 13, reference numeral 18 denotes a long-periodic timer and 19 denotes its library. It should be noted that since components in FIG. 13 which are the same as or correspond to those in FIG. 11 are denoted by like numerals, their explanation will be omitted. Furthermore, since the primary-OS process steps, the secondary-OS process steps, and the secondary-OS interrupt steps are the same as those shown in FIGS. 12 and 4, their explanation will be also omitted.

The processor power-saving control method described below changes the type of timer used to issue a timer interrupt depending on the type of task to be executed. That is, the long-periodic timer is used for tasks which must always wait a lapse of time in the case where the intervals between their operations are long. On the other hand, a short-periodic timer, that is, the hardware timer 17 is used for the other tasks which need not wait a lapse of time. When the tasks 7 on the primary OS 1 and the tasks 12 on the secondary OS 8 are of types which always require a time wait operation, the hardware timer 17 is stopped since it is not necessary to issue a timer interrupt again.

For tasks which always require a time wait operation, on the other hand, the hardware timer 17 cannot be stopped since it is necessary to issue a timer interrupt again. Thus, when a task is of a type which always requires a time wait operation, a timer interrupt frequently occurs during the time wait operation, making it impossible to keep the processor power-saving mode. To cope with this problem, the long-periodic timer 18 is used to issue a timer interrupt, instead of the short-periodic timer, that is, the hardware timer 17, making it possible to stop the hardware timer 17.

The processor power-saving control method of the fifth embodiment has a problem in that when there is any task to be executed which always requires a time wait operation, it is not possible to stop the hardware timer 17, resulting in occurrence of frequent timer-interruption at very short time intervals. On the other hand, the processor power-saving control method of the sixth embodiment employs a timer of a type applied to, for example, a clock application requiring long-periodic timer interrupts, for tasks which always require a time wait operation. With this arrangement, a task which always requires a time wait operation can be controlled by another timer, making it possible to stop periodic interruption of the hardware timer 17 and thereby keep the processor 2 in the power-saving mode for a longer time to reduce the power consumption.

Furthermore, since the processor power-saving control device described above has the long-periodic timer 18, it is possible to use the long-periodic timer 18 for a task having a different execution wait time and thereby stop the hardware timer 17 to reduce the power consumption.

Seventh Embodiment

Figure 14:
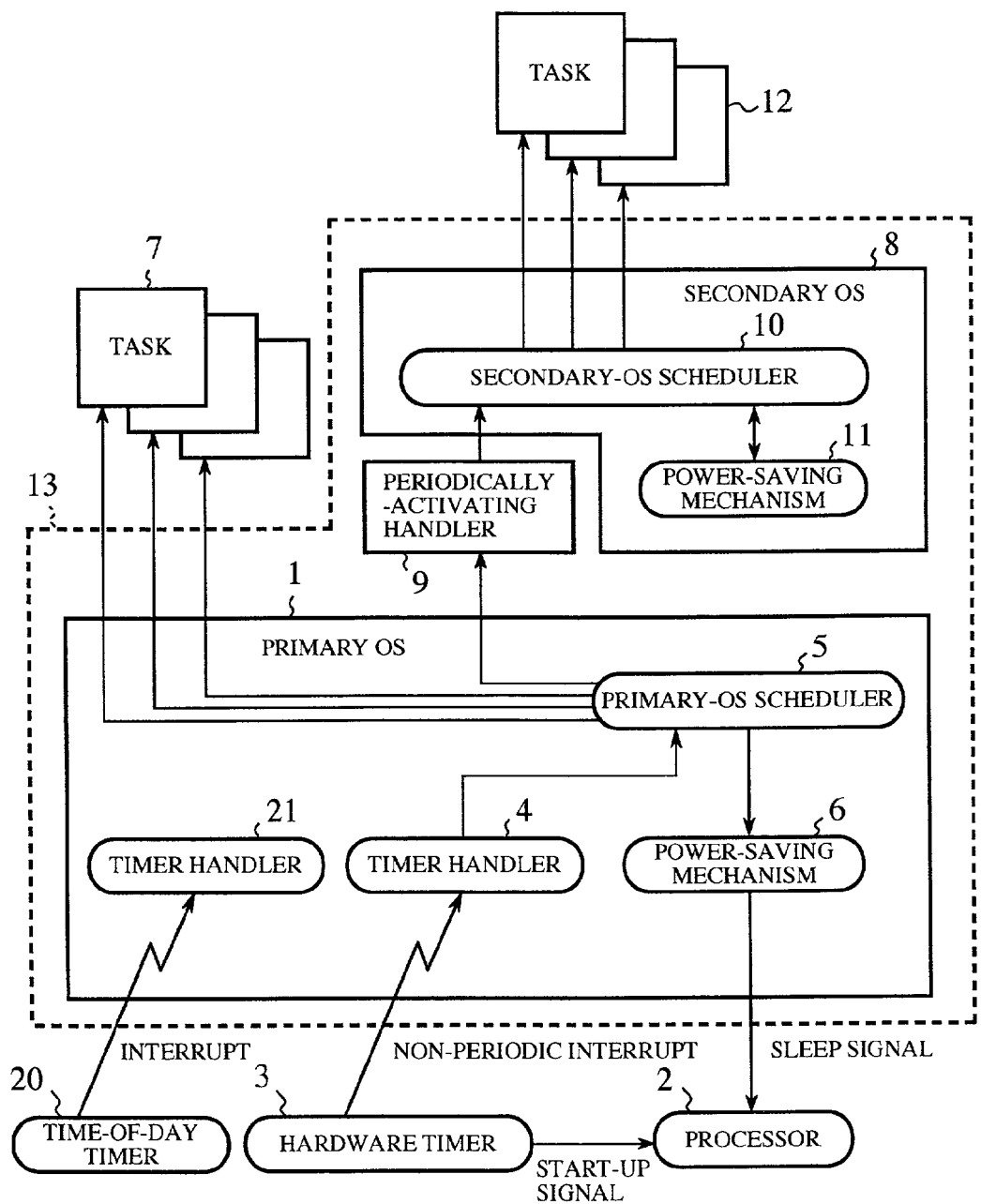
FIG. 14 is a conceptual diagram showing a processor power-saving control device according to a seventh embodiment of the present invention.
Figure 15:
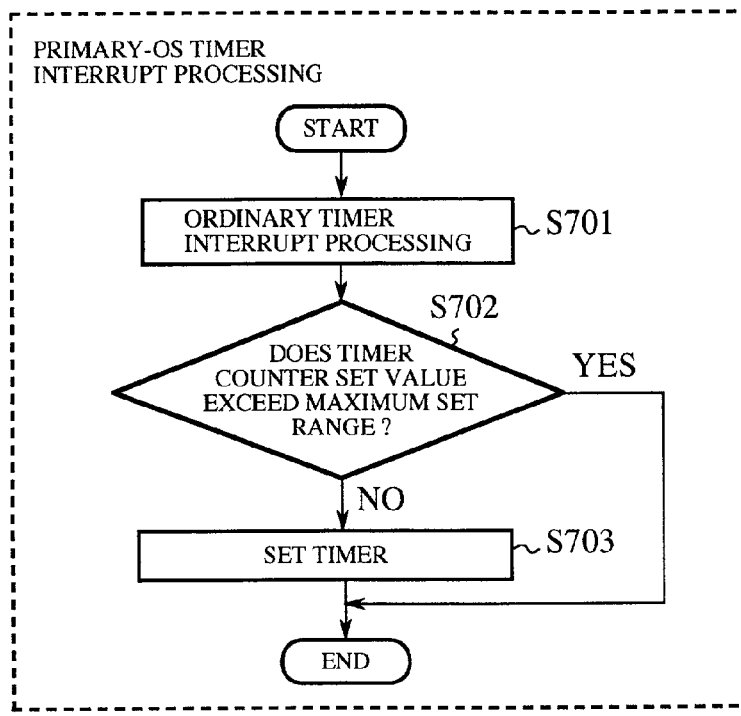
FIG. 15 is a flowchart illustrating primary-OS process steps employed by a processor power-saving control method according to the seventh embodiment of the present invention.
Figure 16:
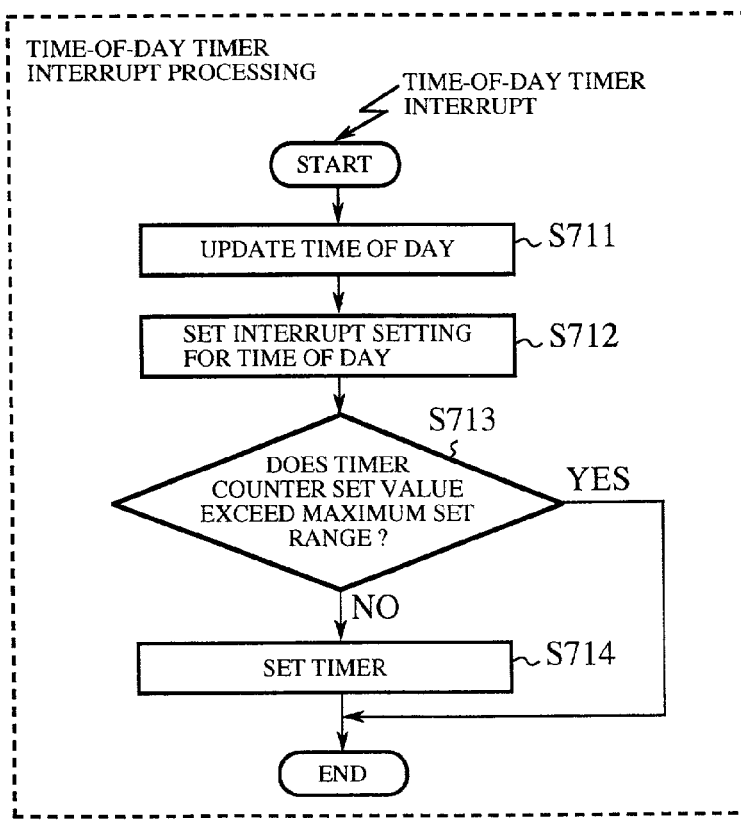
FIG. 16 is a flowchart illustrating interrupt processing by a time-of-day timer.

FIG. 14 is a conceptual diagram showing a processor power-saving control device according to a seventh embodiment of the present invention. FIG. 15 is a flowchart illustrating timer interrupt process steps included in the primary-OS process steps. FIG. 16 is a flowchart illustrating an interrupt process performed by a time-of-day timer. Referring to FIG. 14, reference numeral 20 denotes a time-of-day timer and 21 denotes its timer handler. It should be noted that since components in FIG. 14 which are the same as or correspond to those in FIG. 2 are denoted by like numerals, their explanation will be omitted.

Generally, when the hardware timer 3 issues non-periodic interrupts and its accurate time operation is required, the time-of-day timer 20 different from the hardware timer 30 is used. The time-of-day timer 20 is limited as to the magnitude of values it can count by use of hardware, depending on, for example, the number of bits employed by the counter, such as 16 bits and 32 bits. When the time-of-day timer 20 has reached the limit value, it interrupts the OS to update the time held there by use of software.

Next, the operation of the processor power-saving control method will be described. Since the primary-OS process steps S101 through 104 and S112 are the same as those of FIG. 3, their explanation will be omitted. Further, since the secondary-OS process steps and the secondary-OS interrupt steps are the same as those in FIG. 4, their explanation will be also omitted. The process step S111 included in the primary-OS process steps is specifically shown in FIG. 15. In FIG. 15, ordinary timer interrupt processing is performed at step S701 and it is determined whether the counter set value of the hardware timer 3 exceeds the maximum set range of the time-of-day timer 20. If the counter set value does not exceed the maximum set range of the time-of-day timer 20, hardware timer setting is performed at step S703. If the counter set value exceeds the maximum set range of the time-of-day timer 20, the primary-OS timer interrupt processing is ended without setting the hardware timer.

Next, the operation of the time-of-day timer interrupt processing is described with reference to FIG. 16. When a time-of-day timer interrupt occurs, the time held by the software is updated at step S711, and time-of-day timer interrupt setting is performed at step S712. To set the timer count value to the time when the next interruption time need be notified after a certain lapse of time, it is determined whether the timer count value exceeds the maximum set range of the time-of-day timer 20, at step S713. If it does not exceed the maximum set range, the hardware timer is set at step S714.

The processor power-saving control method described above collectively controls the time-of-day timer 20 and the hardware timer interrupts to reduce the number of timer interrupts to be issued, making it possible to keep the processor 2 in the power-saving mode for a longer time.

Furthermore, since the processor power-saving control device has the time-of-day timer 20, a timer interrupt can be issued at an accurate time of day.

INDUSTRIAL APPLICABILITY

As described above, the processor power-saving control methods, the storage medium, and the processor power-saving control devices according to the present invention are employed in the environment in which a plurality of OSs exist on a single processor having a power-saving function, and are suitable for collectively control a timer interrupt issued to each OS so as to reduce the number of timer interrupts to be issued, effectively maintaining the processor power-saving mode.

The invention claimed is:

1. A processor power-saving control method which employs a plurality of Operating Systems (OSs) whose execution is controlled by a processor, wherein said plurality of OSs include
   a primary OS for receiving a timer interrupt issued from a hardware timer after a predetermined time lapse, and
   a secondary OS treated as a task to be executed by said primary OS, said processor power-saving control method comprising the steps of:
   receiving said timer interrupt at said primary OS;
   determining with said primary OS whether there exists any task scheduled to be executed on said secondary OS;
   interrupting said secondary OS by issuing a secondary-OS interrupt from the primary OS to the secondary OS when the primary OS determines there exists any task scheduled to be executed on said secondary OS; and
   removing the secondary OS from a power-saving mode in response to the secondary OS receiving the secondary OS-interrupt issued from the primary OS.

2. The method of claim 1, wherein removing the secondary OS from the power-saving mode further comprises increasing a frequency of a processor clock signal.

3. The method of claim 1, wherein removing the secondary OS from the power-saving mode further comprises exiting a sleep mode using a sleep Application Program Interface (API).

4. A processor power-saving control method which employs a plurality of Operating Systems (OSs) whose execution is controlled by a processor,
   operation of said processor being placed in a power-saving mode when there exists no task scheduled to be executed on said plurality of OSs,
   said processor power-saving control method controlling timer interrupt processing performed by a hardware timer which causes said processor to exit the power-saving mode after an arbitrary time lapse,
   said processor power-saving control method keeping a power-saving state of said processor,
   said plurality of OSs including a primary OS for receiving a timer interrupt issued from said hardware timer and a secondary OS treated as a task to be executed by said primary OS,
   said processor power-saving control method comprising:
   a primary-OS process step performed by said primary OS;
   a secondary-OS process step performed by said secondary OS; and a secondary-OS interrupt step,
   said primary-OS process step including
      detecting said timer interrupt,
      a first determination step of, upon receiving said timer interrupt, determining whether there exists any task scheduled to be executed, and
      a processor stopping step of placing said processor in the power-saving mode when there is no task scheduled to be executed;
   said secondary-OS process step including
      a second determination step of determining whether there exists any task scheduled to be executed, and
      handing over processing to said first determination step when there is no task scheduled to be executed;
   said secondary-OS interrupt step including
      receiving a secondary-OS interrupt from said primary OS,
      performing interrupt processing on said secondary OS when said first determination step has determined that there exists any task scheduled to be executed on said secondary OS, and
      executing said second determination step at a predetermined time measured from said interrupt.

5. The processor power-saving control method as claimed in claim 4, wherein said secondary-OS interrupt step is executed by a periodically-activating handler which interrupts said secondary OS at regular time intervals.

6. The processor power-saving control method as claimed in claim 4, wherein said secondary-OS interrupt step is executed by an alarm handler which interrupts said secondary OS after a specified time period.

7. The processor power-saving control method as claimed in claim 4, wherein said secondary-OS interrupt step is executed by a high-priority task which is a task for interrupting said secondary OS and has a highest priority order among tasks scheduled to be executed by said primary OS.

8. The processor power-saving control method as claimed in claim 4, wherein said processor stopping step includes a step of determining whether time taken until said hardware timer issues a next timer interrupt is longer than a predetermined time, and if a measured time is longer than said predetermined time, said processor stopping step stops operation of said processor.

9. The processor power-saving control method as claimed in claim 4, wherein said primary-OS process step further comprises steps of:
   when said hardware timer periodically performs timer interrupt processing at regular time intervals, determining whether timer interrupt processing is required again by a time at which a task is scheduled to be executed; and
   if timer interrupt processing is not required again, stopping said hardware timer.

10. The processor power-saving control method as claimed in claim 9, wherein said primary-OS process step further comprises a step of:
    detecting a timer interrupt issued by a long-periodic hardware timer which issues a timer interrupt at a time interval longer than that of said hardware timer.

11. The processor power-saving control method as claimed in claim 4, wherein said primary-OS process step further comprises a step of:
    detecting a timer interrupt issued by a time-of-day timer which measures a time of day as well as issuing a timer interrupt at a predetermined time of day.

12. The process power-saving control method of claim 4, wherein the secondary-OS interrupt step further includes the step of:
    activating the secondary OS from the power-saving mode in response to the secondary OS receiving the secondary-OS interrupt from the primary OS.

13. The method of claim 12, wherein activating the secondary OS from the power saving mode further comprises increasing a frequency of a processor clock signal.

14. The method of claim 12, wherein activating the secondary OS from the power saving mode further exiting a sleep mode using a sleep Application Program Interface (API).

15. The method of claim 4, wherein placing said processor in the power-saving mode further comprises reducing a frequency of a processor clock signal.

16. The method of claim 4, wherein placing said processor in the power-saving mode further comprises stopping a processor clock signal.

17. The method of claim 4, wherein placing said processor in the power-saving mode further comprises entering a sleep mode using a sleep Application Program Interface (API).

18. A computer readable storage medium storing a plurality of Operating Systems (OSs) whose execution is controlled by a processor which is stopped when there exists no task scheduled to be executed, said plurality of OSs including a primary OS for receiving a timer interrupt issued from a hardware timer which activates said processor after an arbitrary time lapse, and a secondary OS treated as a task to be executed by said primary OS,
    wherein said computer readable storage medium stores a program which causes a computer to perform: a primary-OS process step on said primary OS; a secondary-OS process step on said secondary OS; and a secondary-OS interrupt step,
    said primary-OS process step including
        detecting said timer interrupt issued by said hardware timer,
        a first determination step of, upon detecting said timer interrupt, determining whether there exists any task scheduled to be executed, and
        a processor stopping step of placing said processor in a power-saving mode where there is no task scheduled to be executed;
    said secondary-OS process step including
        a second determination step of determining whether there exists any task scheduled to be executed, and handing over processing to said first determination step when there is no task scheduled to be executed;
    said secondary-OS interrupt step including
        receiving a secondary-OS interrupt from said primary OS,
        performing interrupt processing on said secondary OS when said first determination step has determined that there exists any task scheduled to be executed on said secondary OS, and
        executing said second determination step at a predetermined time measured from said interrupt.

19. The computer readable storage medium of claim 18, wherein the secondary-OS interrupt step includes the step of:
    activating the secondary OS from the power-saving mode in response to the secondary OS receiving the secondary-OS interrupt from the primary OS.

20. The method of claim 19, wherein activating the secondary OS from the power saving mode further comprises increasing a frequency of a processor clock signal.

21. The method of claim 19, wherein activating the secondary OS from the power saving mode further exiting a sleep mode using a sleep Application Program Interface (API).

22. The computer readable storage medium of claim 18, wherein placing said processor in the power-saving mode further comprises reducing a frequency of a processor clock signal.

23. The computer readable storage medium of claim 18, wherein placing said processor in the power-saving mode further comprises stopping a processor clock signal.

24. The computer readable storage medium of claim 18, wherein placing said processor in the power-saving mode further comprises entering a sleep mode using a sleep Application Program Interface (API).

25. A processor power-saving control device comprising:
    a timer device including a hardware timer configured to issue a timer interrupt after an arbitrary time lapse, and activate a processor, operation of said processor being placed in a power-saving mode when there exists no task scheduled to be executed; and
    a storage device configured to store a primary Operating System (OS) and a secondary OS;
    wherein said primary OS, upon receiving said timer interrupt at said primary OS, is configured to determine whether there exists any task scheduled to be executed, and to cause said processor to enter the power-saving mode if there is no task scheduled to be executed and to issue a secondary-OS interrupt if there is any task scheduled to be executed; and
    said secondary OS, upon receiving the secondary-OS interrupt from said primary OS, is configured to determine whether there exists any task scheduled to be executed, and if there is any task scheduled to be executed, to execute the task, said secondary OS being treated as a task scheduled to be executed by said primary OS.

26. The processor power-saving control device as claimed in claim 25, wherein said timer device has a long-periodic timer which issues a timer interrupt at a time interval longer than that of said hardware timer.

27. The processor power-saving control device as claimed in claim 25, wherein said timer device has a time-of-day timer.

28. The processor power-saving control device as claimed in claim 25, wherein said secondary OS is further configured to activate from the power-saving mode in response to the receipt of the secondary-OS interrupt.

29. The device of claim 28, wherein the secondary OS is further configured to activate from the power-saving mode by increasing a frequency of a processor clock signal.

30. The device of claim 28, wherein the secondary OS is further configured to activate from the power-saving mode by exiting a sleep mode using a sleep Application Program Interface (API).

31. The device of claim 25, wherein the primary OS is further configured to cause the processor to enter the power-saving mode by reducing a frequency of a processor clock signal.

32. The device of claim 25, wherein the primary OS is further configured to cause the processor to enter the power-saving mode by stopping a processor clock signal.

33. The device of claim 25, wherein the primary OS is further configured to cause the processor to enter the power-saving mode by entering a sleep mode using a sleep Application Program Interface (API).

* * * * *